Figure 1:
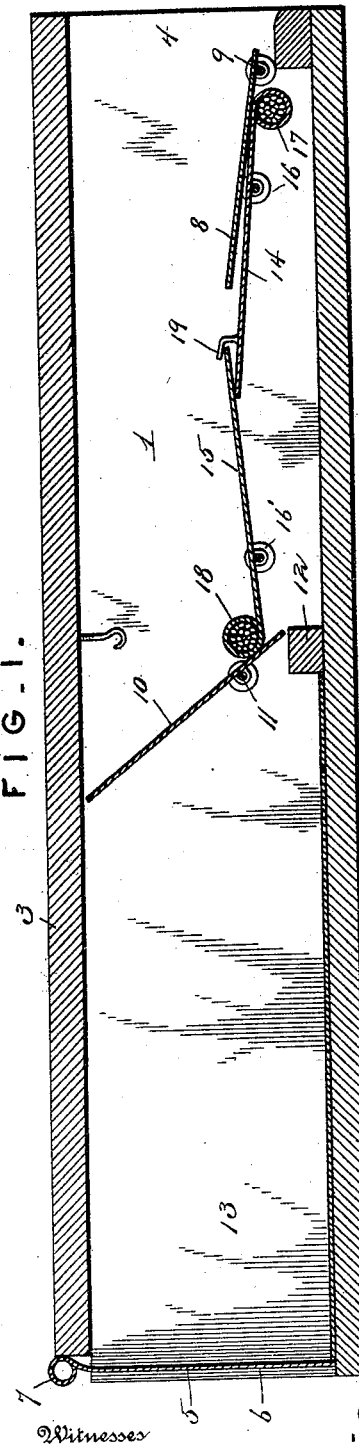

No. 617,617. Patented Jan. 10, 1899.
O. THORNLEY.
TRAP.
(Application filed June 17, 1898.)
(No Model.)

Witnesses
Harry L. Ames.
Paca Oberlin

Inventor
Olney Thornley.
by V. D. Stockbridge
his Attorney.

UNITED STATES PATENT OFFICE.

OLNEY THORNLEY, OF PARADISE, OKLAHOMA TERRITORY.

TRAP.

SPECIFICATION forming part of Letters Patent No. 617,617, dated January 10, 1899.

Application filed June 17, 1898. Serial No. 683,730. (No model.)

*To all whom it may concern:*

Be it known that I, OLNEY THORNLEY, a citizen of the United States, residing at Paradise, in the county of Payne and Territory of Oklahoma, have invented certain new and useful Improvements in Traps; and I do hereby declare the following to be a full, clear, and exact description of the invention, such as will enable others skilled in the art to which it appertains to make and use the same.

This invention relates to traps, and is especially designed as a rodent-trap, but may with equal advantage be used for all kinds of small animals.

The primary object of the invention is to provide a self-setting trap by which a number of animals may be successively caught and caged within the body of the trap.

It is also the object of the invention to make the trap of a shape and size which will adapt it to be used in small spaces, in narrow hallways, and to be placed behind washstands, bureaus, and other articles of furniture close to the washboard.

The detailed objects and advantages of the invention will be fully set forth in the course of the subjoined description.

The invention consists in a trap embodying certain novel features and details of construction and relative arrangement of parts, as hereinafter fully described, illustrated in the drawings, and incorporated in the claims.

Figure 2:
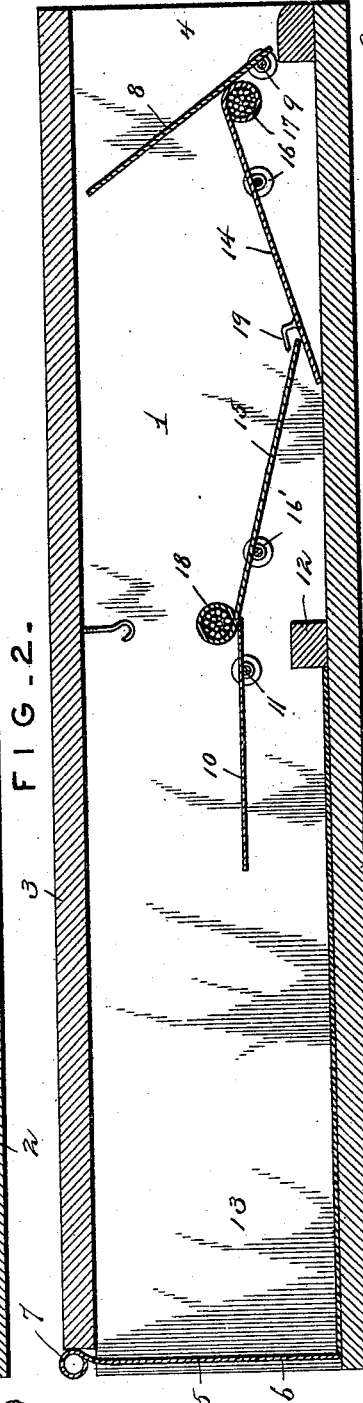
Figure 3:
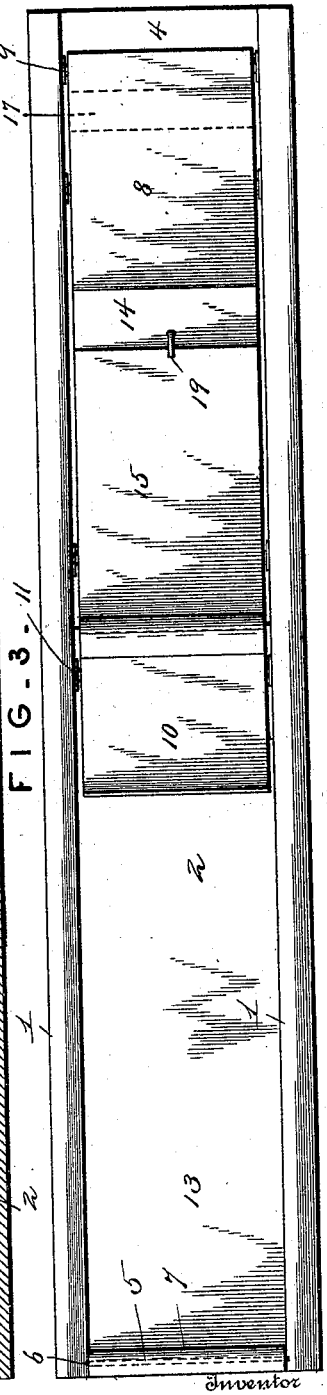
Figure 4:
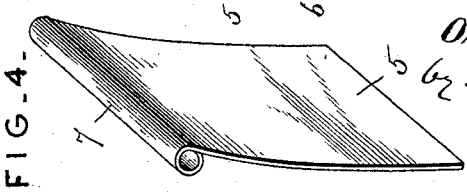

In the accompanying drawings, Figure 1 is a vertical longitudinal section through the trap, showing the same set, the parts being in their normal positions. Fig. 2 is a similar view showing a position of the parts after an animal has entered the trap and before it enters the cage-compartment. Fig. 3 is a plan view of the trap with the top removed. Fig. 4 is a detail perspective view of the exit-door or slide.

Similar numerals of reference designate corresponding parts in all the views.

The trap contemplated in this invention is of oblong form, the length being sufficient to provide the trap at one end and a cage or compartment at the opposite end, the two compartments being in longitudinal alinement. The trap comprises parallel sides 1, connected by a bottom 2 and a top 3. At the forward or entrance end the box forming the body of the trap is left open, as at 4, to permit the animal to enter. At its opposite end the trap is closed by a vertically-sliding door 5, which is curved longitudinally, as shown in Fig. 4, and preferably constructed from a piece of spring sheet metal, the side edges being slidingly fitted in vertical grooves 6 in the inner adjacent surfaces of the sides 1, near the rear end of the trap. The upper end of the slide or exit-door is curled or rolled, as indicated at 7, to form a finger-grip or handle, whereby the door may be manipulated. By moving the door longitudinally it is caused to bind frictionally in the grooves in which it slides, and it is furthermore designed to bind frictionally against the rear edge of the top 3, the latter being somewhat shorter than the sides, as clearly shown in the sectional views.

Arranged near the entrance 4 is an entrance-door 8, which is pivotally mounted at its lower edge on a transverse rod or shaft 9, the upper edge being left free to swing and being limited in its outward movement by contact with the top 3. At a point about midway the ends of the trap is an intermediate door or cut-off 10, which is pivotally mounted intermediate its ends on a transverse rod or shaft 11, connecting the sides 1. The greater or longer portion of this door or cut-off is free to swing upward, while the opposite or shorter end is arranged to come in contact with a transverse stop 12 in the form of a strip, secured to the bottom and extending transversely across the trap. In this way the door 10 can swing to an approximately horizontal position for allowing the animal to pass into the final compartment 13, which forms the cage, while its upward-swinging movement is limited by the stop, thereby preventing the animals from passing backward into the trap or initial portion of the box.

Located intermediate the entrance and intermediate doors 8 and 10 are two tread-levers 14 and 15 in the form of plates, the width of which is slightly less than the distance between the sides. Each of the plates 14 and 15 is pivotally mounted intermediate its ends on transverse rods or shafts 16 16'. Both of the plates 14 and 15 are preferably formed from sheet metal, and the plate 14 has that edge which is nearest the entrance end of the trap curled or rolled to form a hollow cylinder 17, which is filled with shot or other small particles of metal, after which the ends of the roller or cylinder are closed by means of stoppers. The effect of this is to weight the shorter end of the tread lever or plate 14, so that the longer or inner portion thereof will normally swing upward. The lever or plate 15 is similarly formed with a hollow cylinder or roller 18 for the reception of shot, the two tread-levers being substantially the same, with the exception that the weighted ends thereof are reversely disposed. At their adjacent ends the levers or plates 14 and 15 overlap each other, and one of said plates is provided with a bent pin or hook 19, which engages the edge of the adjoining plate, whereby the two plates or levers are coupled together and caused to swing simultaneously.

In their normal arrangement the levers 14 and 15 lie in an approximately horizontal plane, while the entrance-door 8 lies flatwise upon the lever 14. The cylinder 18 of the tread-lever 15 rests upon the shorter arm or portion of the intermediate door or cut-off 10, thereby holding said door in its upward-inclined position, as shown in Fig. 1.

The operation of the trap is as follows: The rodent enters the open end 4 of the trap, passing over the door 8 and coming upon the tread-levers 14 and 15. The weight of the rodent causes these levers or plates to descend, which results in closing the entrance-door 8 and allowing the cut-off 10 to move downward to a horizontal position, as shown in Fig. 2. The rodent now passes over the door 10 into the cage-compartment, whereupon the weighted portions of the tread-levers 14 and 15 descend and restore said levers to their normal horizontal position. This lifts the cut-off 10 and lowers or opens the entrance-door 8, thereby resting the trap, the door 10 preventing the rodent from passing backward into the initial portion of the trap.

The trap hereinabove described is extremely simple in construction and can be manufactured very cheaply. By reason of this particular shape it can be located in a circumscribed place and readily placed behind various articles of furniture close to a washboard where it will be unobserved. The animals may be released from the trap by opening the exit-door 5.

Having thus described the invention, what is claimed as new, and desired to be secured by Letters Patent, is—

1. In an animal-trap, a box of oblong form, a pivoted entrance-door at one end, a sliding exit-door at the opposite end, an intermediate pivoted door or cut-off, and a pair of tread-levers located intermediate the entrance-door and cut-off door, the said tread-levers being coupled to each other and arranged to coöperate with the entrance-door and cut-off door, whereby the operative parts of the trap reset themselves automatically, substantially as described.

2. In a trap, the combination with an oblong box, of an entrance-door pivotally mounted at its lower end, an exit-door at the opposite end of the trap, an intermediate door or cut-off pivotally mounted intermediate its ends, and a pair of tread-levers pivotally mounted intermediate their ends, the shorter arms or portions of said levers being weighted and the adjoining ends being overlapped and coupled together, substantially as and for the purposes described.

3. In a trap, the combination with a box or casing, of a pivoted entrance-door, a cut-off door located intermediate the ends of the trap, and a weighted tread-lever pivotally mounted intermediate said doors, said tread-lever being in the form of a plate one end of which is rolled or curled to form a hollow cylinder designed to receive a suitable weight and stoppers inserted in the ends of said cylinder, substantially as described.

In testimony whereof I affix my signature in presence of two witnesses.

OLNEY THORNLEY.

Witnesses:
EDWIN R. THOMAS,
WILLIAM S. BUNTING.